United States Patent [19]

Niederprum

[11] Patent Number: 4,572,382
[45] Date of Patent: Feb. 25, 1986

[54] STORAGE AND TRANSPORTATION RACK

[75] Inventor: Klaus Niederprum, Bergheim, Fed. Rep. of Germany

[73] Assignee: Ford Motor Company, Dearborn, Mich.

[21] Appl. No.: 649,782

[22] Filed: Sep. 12, 1984

[30] Foreign Application Priority Data

Sep. 14, 1983 [DE] Fed. Rep. of Germany ....... 3333118

[51] Int. Cl.$^4$ .............................................. A47F 5/00
[52] U.S. Cl. ..................................... 211/150; 108/134
[58] Field of Search ................... 211/150, 149, 49 S, 211/605, 41, 169.1, 170; 108/136, 152, 134; 414/902

[56] References Cited

U.S. PATENT DOCUMENTS

| 2,675,133 | 4/1954 | Ostlund | 211/49 S |
| 4,200,195 | 4/1980 | Hager | 211/150 X |

FOREIGN PATENT DOCUMENTS 901040 7/1949 Fed. Rep. of Germany.
2930053 5/1981 Fed. Rep. of Germany.

Primary Examiner—Robert W. Gibson, Jr.
Attorney, Agent, or Firm—Clifford L. Sadler; Daniel M. Stock

[57] ABSTRACT

A rack (1) for stacking and transporting flat components comprises a base (2), support columns (3) extending generally vertically from the base (2), and shelves (5) mounted in the support columns (3) for pivotal movement about horizontal axes and arranged closely one above the other. Each shelf (5) includes a support part (5), for receiving a flat component (15), disposed on one side of the pivot axis (7), and a counterweight (9) and a control arm (8) disposed on the other side of the pivot axis. In use, when a component (14) is placed on the support part (6) of a shelf (5), the latter is moved from an inclined receiving position into a horizontal supporting position, and during such movement the control arm of the shelf cooperates with the control arm of the shelf (5) immediately above to move the upper shelf from a vertical position in which the shelf is retracted between the support columns (3) to the inclined receiving position. To permit a smaller space between the shelves, the support parts (6), the control arms (8), and the counterweights (9) of the respective shelves (5) are arranged in different vertical planes, and to enable locking of the shelves (5) they are further provided with locking arms (10) arranged in a further verticle plane, the planes being spaced in the direction of the pivot axes (7) of the shelves (5).

5 Claims, 8 Drawing Figures

STORAGE AND TRANSPORTATION RACK

BACKGROUND OF THE INVENTION

1. Field of Invention

The invention relates to a storage and transportation rack having folding shelves for the stacked reception of flat components.

2. Description of the Prior Art

A storage and transportation rack of this type is known from the German Pat. No. 29 30 053. In the rack disclosed in this patent, a plurality of shelves are pivotably mounted closely one above the other on support columns. Each shelf is capable of adopting a generally vertical position in which it is retracted between the columns, an inclined position for receiving a flat component and a generally horizontal support position.

Each shelf has a support part on which the component rests and a control arm. The control arms of adjacent shelf elements cooperate with one another in such a manner that as a shelf is pivoted into its horizontal position by the weight of a component placed upon it, its control arm pivots the shelf above it into an inclined position to receive the next component.

In this known rack, the support part and the control arm of each shelf are arranged in closely adjoining planes and the control arm also acts as a counterweight in order to cause the support part to swing back into its retracted position when the component is removed. For this reason, the support part must be kept as light as possible, for example by drilling holes in it, while the control arm must be weighted. Such a construction necessitates a relatively large distance, for example 3 cm, to be maintained between the stacked components. This storage rack also has the disadvantage that the receiving elements cannot be locked in their supporting position, as would be required for transportation.

There is also known from German Specification No. 901 040, a rack designed for similar bundles of bar material in which the receiving elements are provided not only with support and control arms but also with their own counterweights. This patent does not enable close packing of the shelves, nor does it allow the shelves to be locked in their supporting positions.

SUMMARY OF THE INVENTION

The invention seeks to provide a storage and transportation rack in which it is possible to maintain a smaller distance between the stacked components and permits the shelves to be locked for transportation in the supporting position.

According to the present invention, there is provided a storage and transportation rack for stacking and transporting generally flat components, comprising a base, a plurality of support columns extending generally vertically from the base, a plurality of shelves mounted in the support columns for pivotal movement about horizontal axes and arranged closely one above the other, each shelf including a support part, for receiving a flat component, disposed on one side of the pivot axis, and a counterweight and a control arm disposed on the other side of the pivot axis, the arrangement being such that when a component is placed on the support part of a shelf, the latter is moved from an inclined receiving position into a horizontal supporting position, and during such movement the control arm of the shelf cooperates with the control arm of the shelf immediately above to move the upper shelf from a vertical position in which the shelf is retracted between the support columns to the inclined receiving position, characterized in that the support parts, the control arms, and the counterweights of the respective shelves are arranged in different vertical planes and in that the shelves are further provided with locking arms arranged in a further vertical plane, the planes being spaced in the direction of the pivot axes of the shelves.

Because separate parts are provided to serve the functions of the control arm, the counterweight and the locking arm for maintaining the shelf in the support position, a more compact arrangement of the shelves is made possible. Furthermore, because these parts lie in different vertical planes, they do not interfere with one another as the shelves are pivoted.

In a preferred embodiment of the invention, there are disposed inside the support columns locking bars which are arranged parallel to the length of the columns and are displaceable at right angles to the columns, the locking bars being movable manually or with the aid of mechanical or hydraulic assistance from an unlocked position releasing the locking arms into a locked position securing the locking arms. The shelves may be locked irrespective of the number of components supported in the rack, so that during transportation by floor conveyors, in which considerable jolts and vibrations are caused by irregularities on the path of travel, the stacked components can be reliably prevented from springing out of the rack.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1:
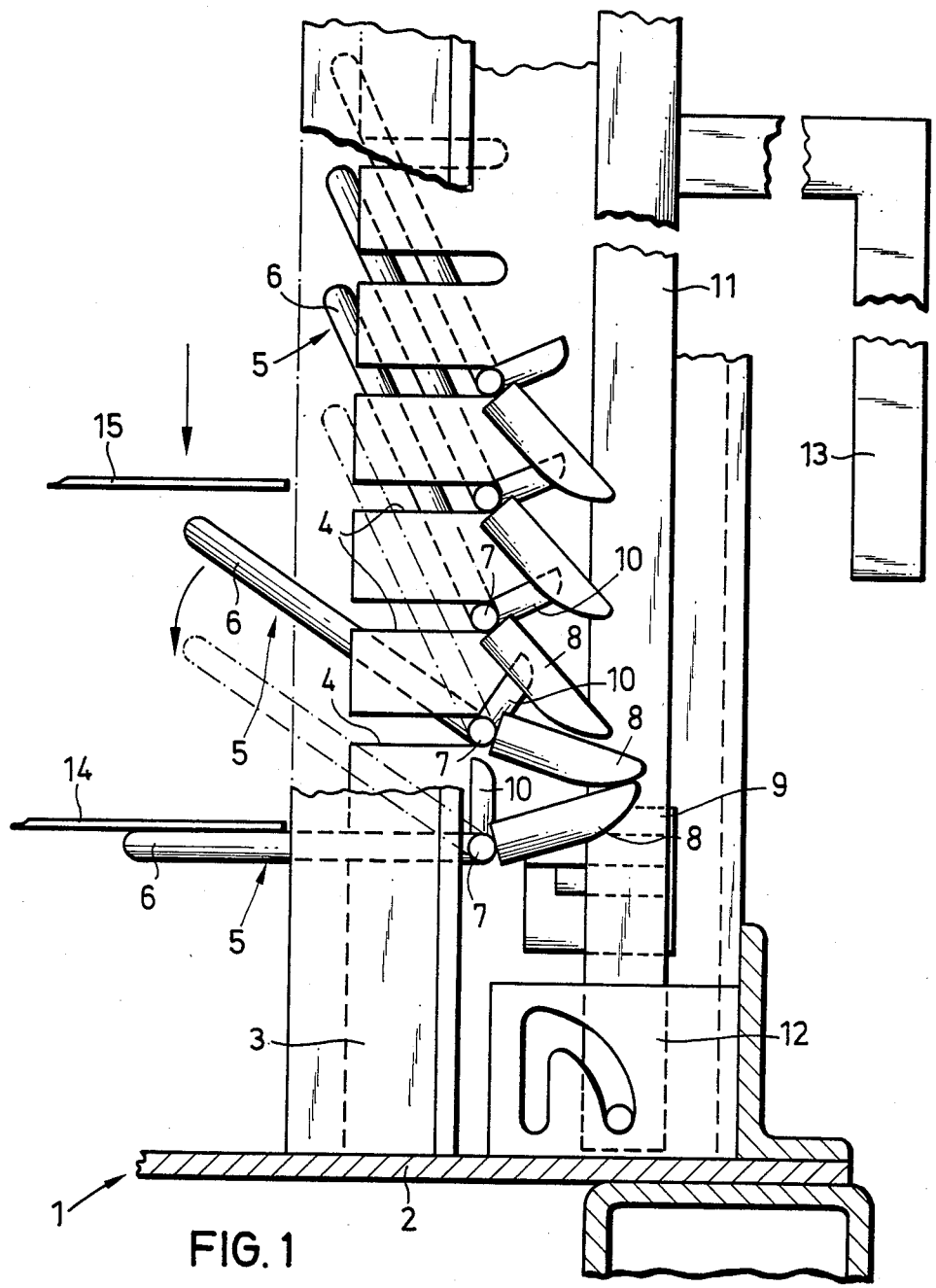
FIG. 1 is an elevation of a support column of a storage and transportation rack according to the invention.

A storage and transportation rack 1 for the stacked reception of flat components of essentially the same format comprises a base pallet 2, which is formed in known manner for convenient handling by fork-lift trucks, and a plurality of vertical support columns 3, only one of which is illustrated in FIG. 1.

A support column of this type may be formed in a simple manner from a U-shaped girder or from a pair of L-shaped girders, in which a plurality of bearing slots 4 are provided for receiving the pivot pins of a plurality of shelves 5.

Figure 2:
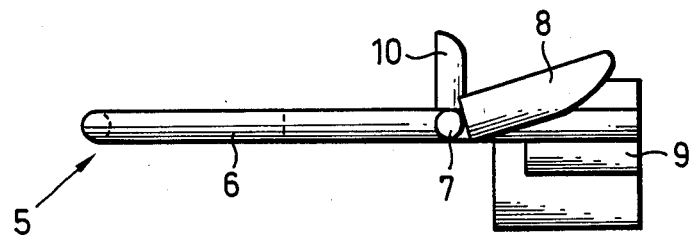
FIG. 2 is a side view of a shelf.
Figure 3:
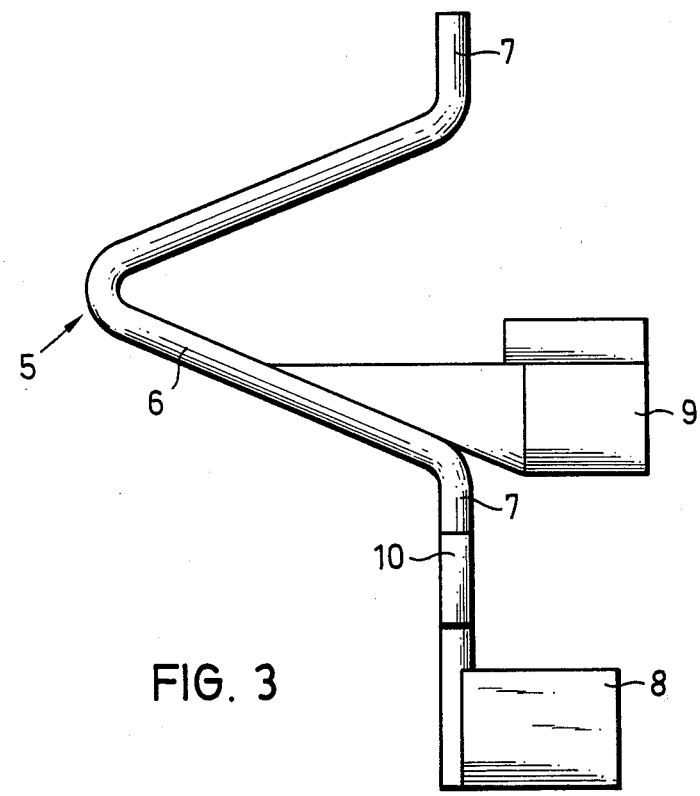
FIG. 3 is a plan view of a shelf.
Figure 4:
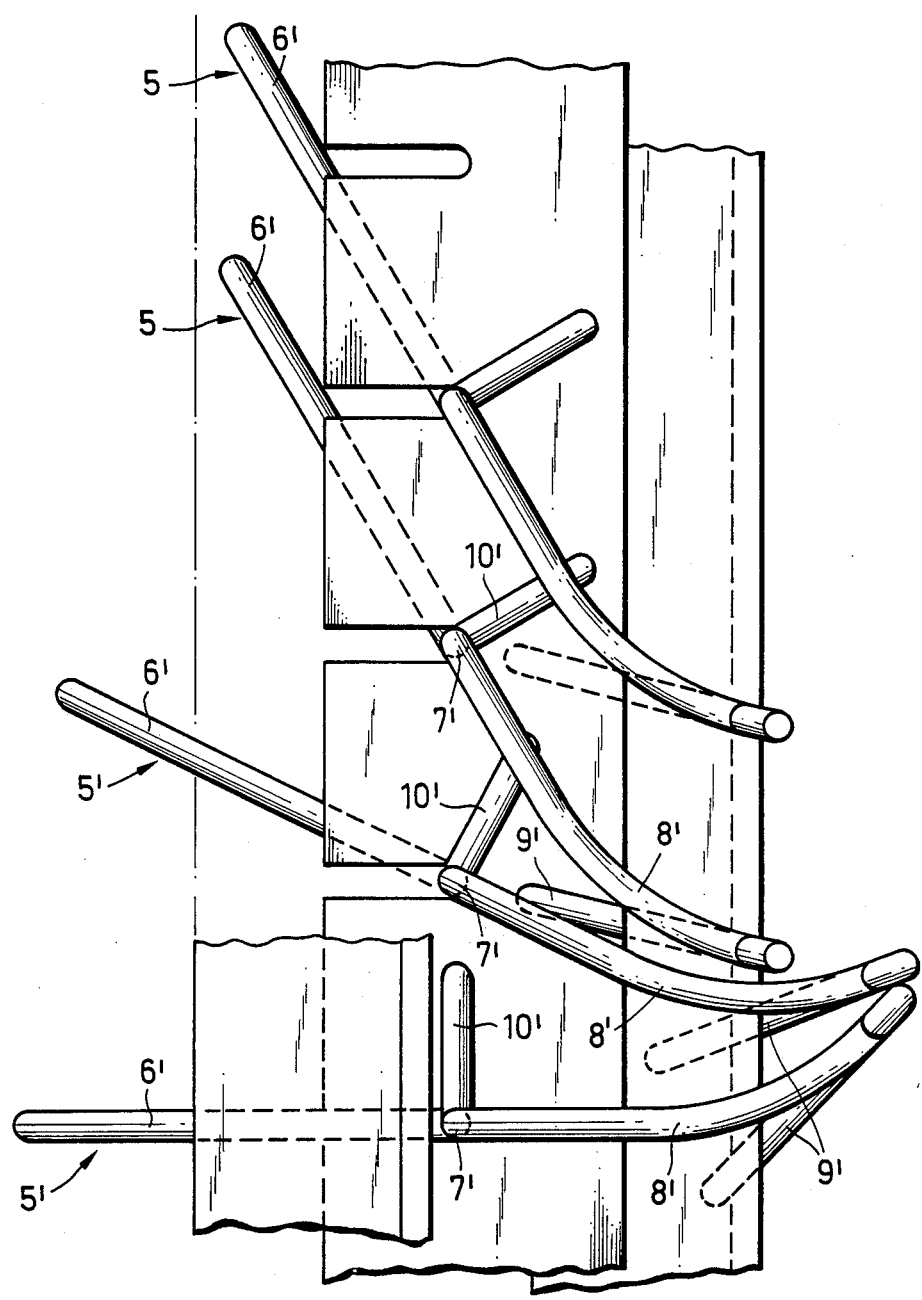
FIG. 4 is a partial elevation of a support column of a storage and transportation rack according to the invention with alternative shelves.
Figure 5:
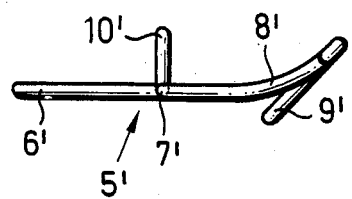
FIG. 5 is a side view of a shelf made of round stock.
Figure 6:
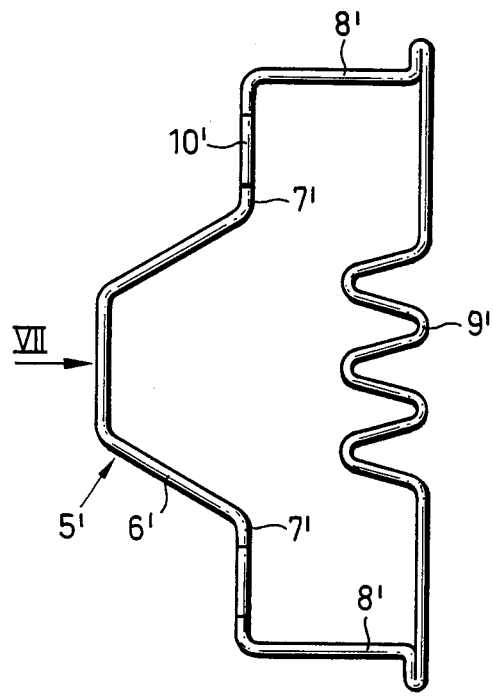
FIG. 6 is a plan view of a shelf made of round stock.
Figure 7:
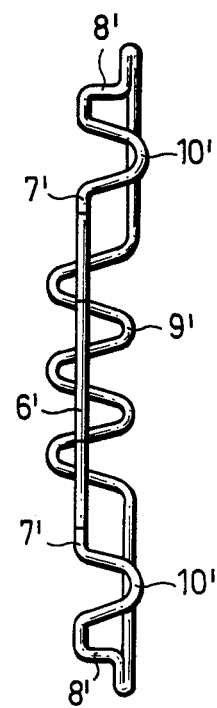
FIG. 7 is an elevation of the shelf viewed in the direction of the arrow VII.

As is clearly shown in FIGS. 2 and 3, the shelves 5 consist of a support part 6 of round stock which is bent into a V shape and the angled ends of which form the pivot pins 7 for the shelf. A control arm 8, a counterweight 9 and a locking arm 10 are secured to the support part 6, for example by welding.

A shelf 5 of this type may alternatively be produced, with its construction adapted accordingly, as a cast part of light metal, for example malleable cast iron and the like, the control arm and the counterweight being formed integrally with the support part.

A further embodiment of a shelf, which can be manufactured very inexpensively, is illustrated in FIGS. 4 to 7, in which the same reference numerals provided with a prime are used for corresponding parts.

The shelf 5' again consists of a support part 6' of round stock, the angled ends of which form the pivot pins 7' of the shelf 5'. By bending the same round stock appropriately, the control arms 8', the counterweight 9' and the locking arms 10' are formed from a single bent-wire component.

Figure 8:
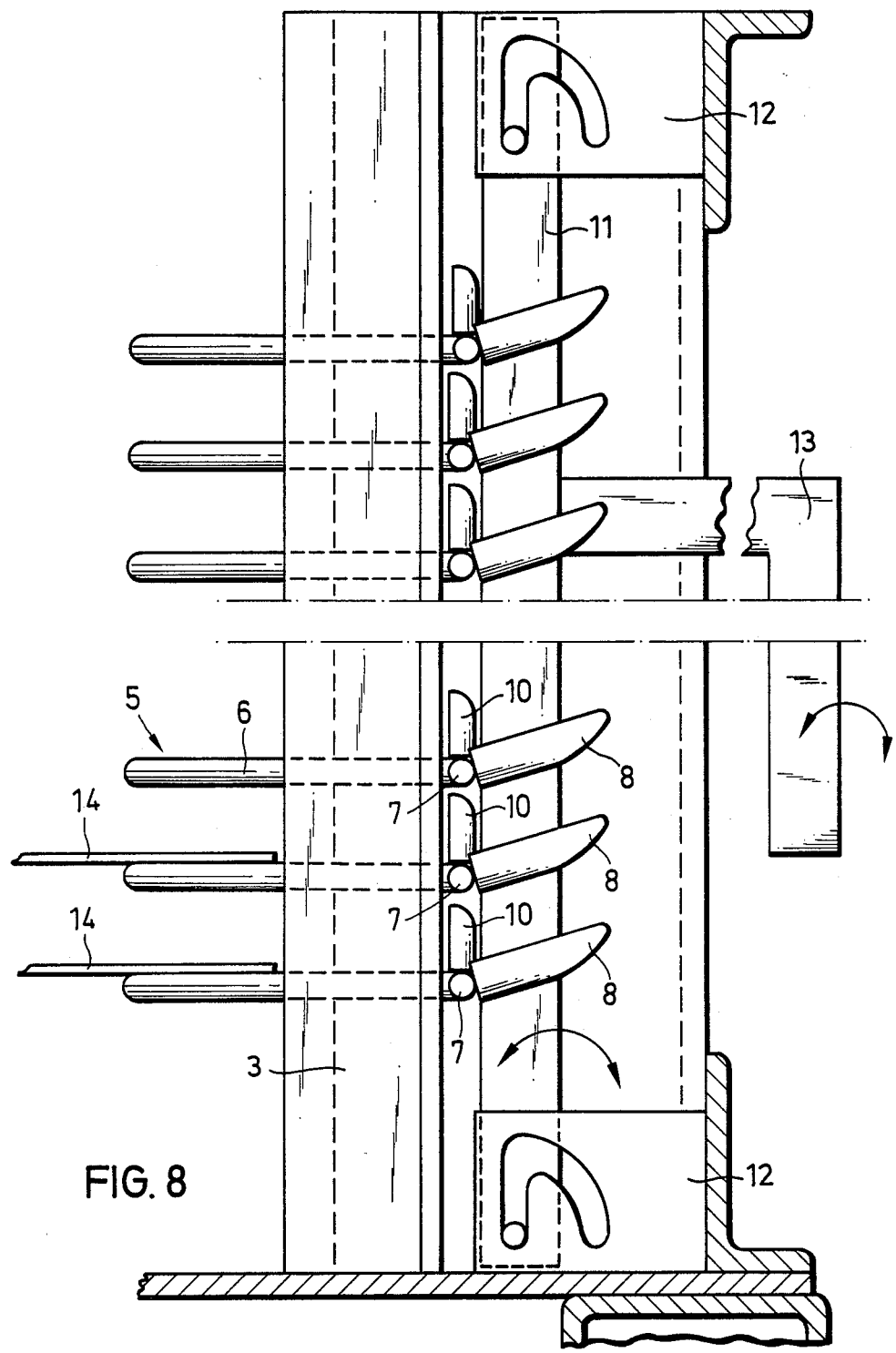
FIG. 8 is an elevation of a support column of a storage and transportation rack according to the invention with an additional locking bar.

In addition to this arrangement, there is provided on each support column 3 a locking bar 11 which extends parallel to the support column 3, is displaceable at right angles thereto and may be moved in upper and lower slotted guides 12 by means of a handle 13 from an unlocked position, which is situated at a distance from the locking arms and is shown in continuous lines in FIG. 1, into a locked position, which tilts and secures the locking arms 10 and which is shown in continuous lines in FIG. 8.

The locking device described in FIGS. 1 and 8 represents only one possible embodiment, but, of course, the locking bar can be moved by appropriate spring-loaded lever devices or by pneumatic or hydraulic auxiliary means.

The operation of the storage and transportation rack is explained below in conjunction with FIGS. 1 and 8.

In a completely empty storage and transportation rack the lowest shelf 6 is initially in its inclined position, which is shown in dash-dot lines, and is moved into its horizontal supporting position shown in continuous lines by a flat component 14 of the same format being placed thereon.

On account of the resulting movement of the control arm 8 during this action, the shelf situated above is swung from its vertical rest position, also shown in dash-dot lines, into its inclined receiving position, shown in continuous lines. In this way the next receiving element is ready to receive the next flat component 15 to arrive.

The locking bar 11 must, of course, be in its unlocked position, as shown in continuous lines in FIG. 1.

If the storage and transportation rack is to be moved either completely filled with flat components or only partially filled, then in order to lock all the shelves, it is only necessary to lift the locking bar 11 in its slotted guides 12 by means of the handle 13 and to lower it again. As a result, the loaded shelves, as well as those not carrying a component, are tilted into their supporting position and held there by way of the locking arms 10. If vibrations occur as a result of transportation, the flat components are therefore largely prevented from springing out of their position.

The locking bar 11 with its mechanism 12 and 13 is, of course, only shown diagrammatically, as widely differing embodiments with spring loading or servo assistance are readily available to the designer of the apparatus.

What is claimed is:

1. A storage and transportation rack for stacking and transporting generally flat components, comprising a base, a plurality of support columns extending generally vertically from the base, a plurality of shelves mounted in the support columns for pivotal movement about horizontal axes and arranged closely one above the other, each shelf including a support part, for receiving a flat component, disposed on one side of the pivot axis, and a counterweight and a control arm disposed on the other side of the pivot axis, the arrangement being such that when a component is placed on the support part of a shelf, the latter is moved from an inclined receiving position into a horizontal supporting position, and during such movement the control arm of the shelf cooperates with the control arm of the shelf immediately above to move the upper shelf from a vertical position in which the shelf is retracted between the support columns to the inclined receiving position, characterized in that the support parts, the control arms, and the counterweights of the respective shelves are arranged in different vertical planes and in that the shelves are further provided with locking arms arranged in a further vertical plane, the planes being spaced in a direction parallel to the pivot axes of the shelves.

2. A storage and transportation rack as defined in claim 1, wherein in each shelf the support part is made from round stock bent in the form of a "V" when viewed in plan, the ends of the "V" being bent to define pivot pins, and wherein the counterweight, the control arm and the locking arm are secured to the support part.

3. A storage and transportation rack according to claim 1, wherein the shelves are formed as cast parts, the support arm, the pivot pins, the counterweight, the control arm and the locking arm being formed integrally.

4. A storage and transportation rack according to claim 1, wherein the shelves are entirely formed of bent round stock.

5. A storage and transportation rack according to claim 1, wherein there is disposed adjacent the support columns at least one locking bar extending parallel to the columns and displaceable at right angles to the columns, the locking bar, when arranged in a position proximate the locking arms, serving to lock all the shelves in the supporting positions.

* * * * *